United States Patent [19]
Mizuno

[11] Patent Number: 5,589,895
[45] Date of Patent: Dec. 31, 1996

[54] HINGE STRUCTURE OF A SPECTACLE FRAME

[76] Inventor: Koji Mizuno, 30-66, Sugimotocho, Sabae-shi, Fukui-ken, Japan

[21] Appl. No.: 565,669

[22] Filed: Dec. 1, 1995

[51] Int. Cl.⁶ .................. G02C 5/22; G02C 5/14; G02C 5/00
[52] U.S. Cl. .................. 351/153; 351/116; 351/121; 351/140; 16/225
[58] Field of Search .................. 351/153, 140, 351/41, 116, 121, 141, 111; 16/228; 2/450

[56] References Cited

U.S. PATENT DOCUMENTS

| | | | |
|---|---|---|---|
| 3,031,925 | 5/1962 | Barrington | 351/140 |
| 3,744,887 | 7/1973 | Dunbar | 351/140 |

Primary Examiner—Hung Dang
Attorney, Agent, or Firm—Koda and Androlia

[57] ABSTRACT

A hinge structure of a spectacle frame has bearings formed at the ends of end pieces provided outside a pair of lenses or outside the rims supporting the lenses, pivotally rotatable shafts at the tips of a pair of temples are pivotally rotatably connected with the bearings, a compressed elastic means, being provided around the pivotally rotatable shaft exposed in the recess between the flange and the support face, to give pressure to the bearing for keeping the sliding face of the temple in slidable contact with the sliding face of the bearing. The hinge structure of a spectacle frame overcomes the disadvantages of the conventional hinge structure; that is functionally excellent because of easy assembling, needlessness of complicated adjustment, and capability to keep the temple turning torque constant for a long time; and that is also excellent in appearance and design.

4 Claims, 3 Drawing Sheets

HINGE STRUCTURE OF A SPECTACLE FRAME

BACKGROUND OF THE INVENTION

1. Field of the Invention

The present invention relates to a hinge structure of a spectacle frame.

2. Prior Art

In the conventional spectacle frame, the end pieces of a pair of lens-holding rims are connected with a pair of temples by very small screws.

With the spectacle frame, the manual touch felt when the temples are turned over and away from the pair of lenses is an important factor affecting the handling convenience of the spectacles. The touch is mainly affected by the frictional resistance between the ends of the end pieces of the rims holding the pair of lenses and the ends of the temples. The conventional spectacle frame, in which the frictional resistance is greatly affected by the tightening degree of the screws, has the following disadvantages.

First, since the screws are very small, the frame assembling work is troublesome, and skill is required for adjusting the tightening degree. Second, the screws often loosen during use of the spectacles, and they must be tightened each time. Third, too loose screwing causes play, and too tight screwing makes the frictional resistance so large as to inconvenience temple turning, and it can wear the parts concerned on their sliding faces if the spectacles are used for a long time with too tight screwing. In this case, since the screws are limited in threaded length, the connected parts cannot be pressed enough to keep the sliding faces to compactly contact with each other, causing play. Fourth, the connected portions are exposed, making the appearance and design awkward.

SUMMARY OF THE INVENTION

The inventor presents a hinge structure of a spectacle frame that overcomes the disadvantages of the conventional hinge structure; that is functionally excellent because of easy assembling, needlessness of complicated adjustment, and capability to keep the temple turning torque constant for a long time; and that is also excellent in appearance and design.

That is, the above hinge structure of a spectacle frame has bearings formed at the ends of end pieces provided outside the rims supporting the lenses and pivotally rotatable shafts at the tips of a pair of temples are pivotally rotatably connected with them.

The said bearings are in the shape of a cube such as a sphere at the ends of the end pieces, having a vertical through-hole, a cut-out portion formed at the bottom of the said through-hole and surrounded by a top sliding face and both side contact faces, and a recess formed at the top of the said through-hole, a support face at the bottom.

The said temples have the pivotally rotatable shaft bent almost at right angles at its tip with some length and inserted in the through-hole of the bearing, a top sliding face near the bend to slidably contact the sliding face of the said cut-out portion, and a flange protruded at the tip of the pivotally rotatable shaft exposed from the recess.

In the above hinge structure of a spectacle frame, a compressed elastic means, such as a coil spring or a synthetic rubber cylinder, is provided around the pivotally rotatable shaft exposed in the recess between the flange and the support face. The elastic means acts to give a predetermined pressure to the bearing, to keep the sliding face of the temple in slidable contact with the sliding face of the bearing.

Therefore, if the pivotally rotatable shaft is pivotally rotated to pivotally turn the temple, a predetermined frictional force acts.

DETAILED DESCRIPTION OF THE INVENTION

Figure 1:
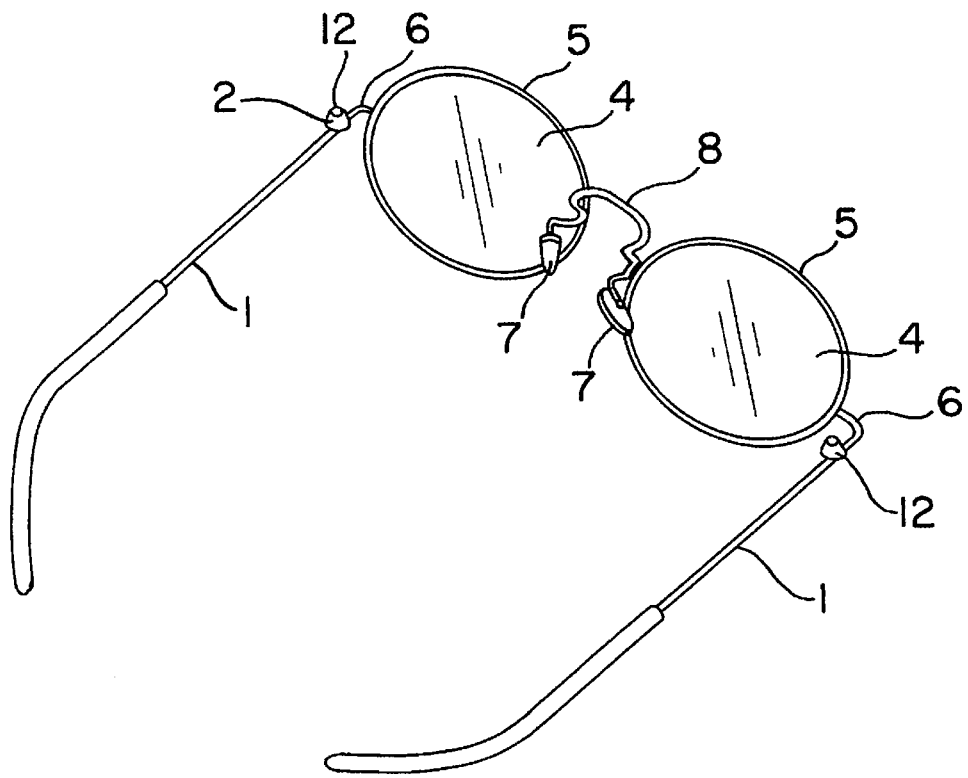
FIG. 1 is a perspective view showing the whole of a spectacle frame using the hinge structure of the present invention.
Figure 2:
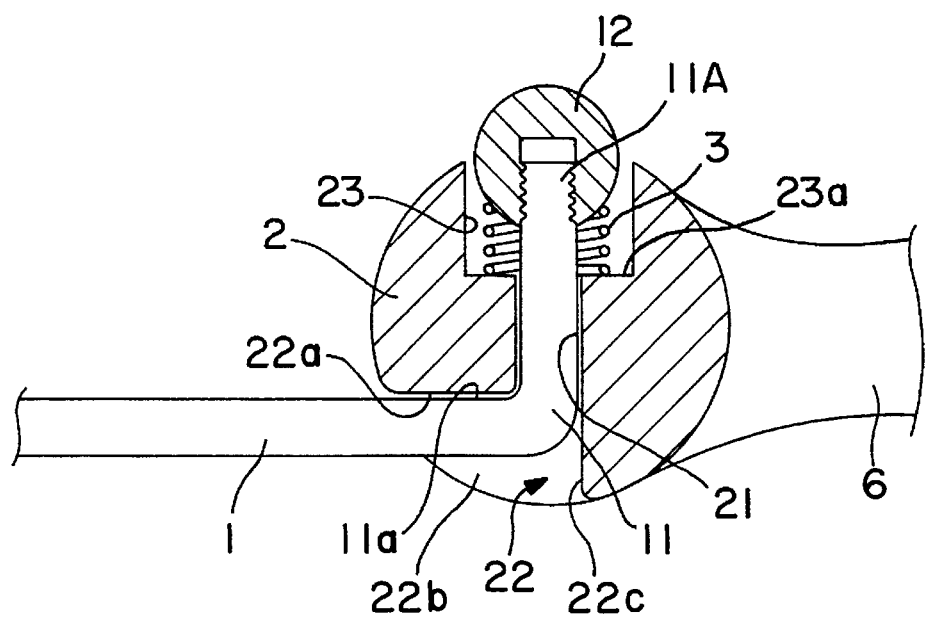
FIG. 2 is an expanded sectional view showing an essential portion for illustrating a first example of the hinge structure of the present invention.

As shown in FIG. 1, a pair of rims 5 with a lense fitted in them respectively are connected and held symmetrically by a bridge 8 provided with nose pads 7 on both sides, and outside the rims 5 on both sides, a pair of end pieces 6 are provided. Each symmetrical half of the hinge structure consists of a pivotally rotatable shaft 11 acting as a spindle for connection, a bearing 2 with a through-hole 21 to bear the pivotally rotatable shaft 11, and an elastic means formed as a coil spring to bear the temple turning resistance, described later.

Figure 4:
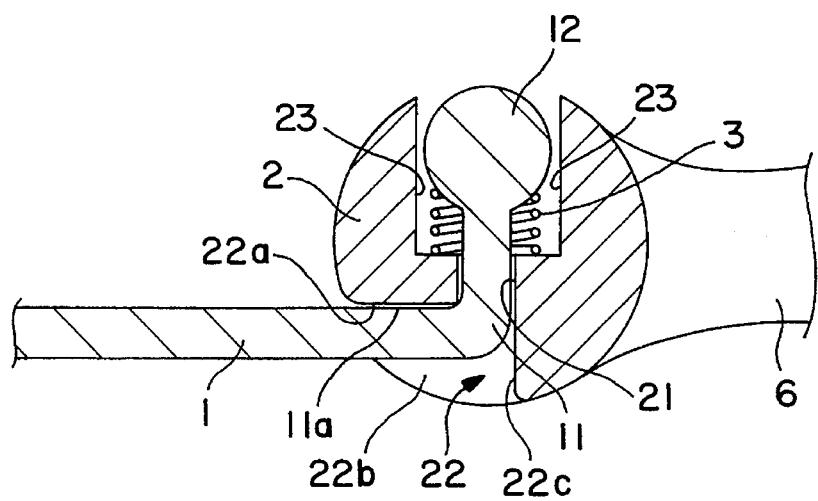
FIG. 4 is an expanded sectional view showing an essential portion for illustrating a second example of the hinge structure of the present invention.

The pivotally rotatable shaft 11 of the first example has external thread 11A formed at its top, and is threadedly engaged with a spherical flange 12 larger in diameter than the pivotally rotatable shaft 11. The pivotally rotatable shaft 11 is bent almost perpendicularly toward the temple 1. These parts: the flange 12, the pivotally rotatable shaft 11, and the temple 1, can be respectively separate parts, or they can be formed as an integral part as shown in FIG. 4.

The temple 1 has a sliding face 11a, to contact the sliding face 22a of a bearing 2, on the surface near the bend.

The bearing 2 is formed as a spherical part swollen at the end of the end piece 6, and it has a vertical through-hole 2a, to have the pivotally rotatable shaft 11 inserted in it, and at the top of the through-hole 21, a recess 23 capable of arranging the said flange 12 and surrounded by a cylindrical wall and the support face 23a for the elastic means 3, is formed.

Figure 3:
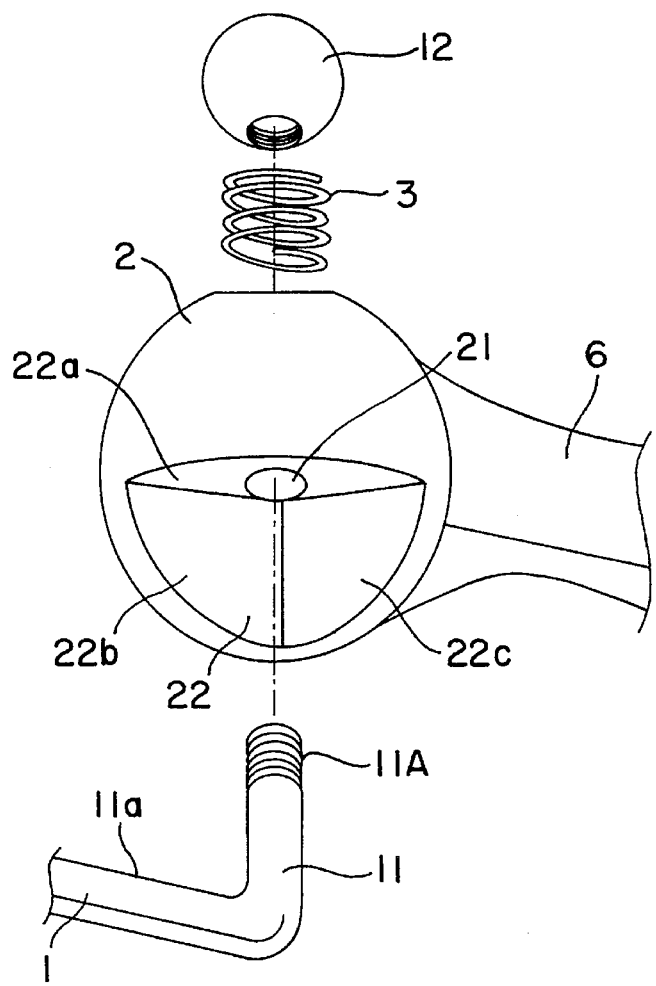
FIG. 3 is an exploded view for illustrating how the first example of the hinge structure of the present invention is composed.

On the other hand, at the bottom of the through-hole 21 of the bearing 2, as shown in FIG. 3, a cut-out portion 22 is formed by a top horizontal fan-shaped sliding face 22a and both side vertical contact faces 22b and 22c.

The elastic means 3 in this example is a coil spring that can give resilience vertically, and it is loosely provided around the pivotally rotatable shaft 11, being compressed between the bottom face of the flange 12 and the support face 23a of the bearing 2. The elastic means 3 acts to give a predetermined pressure to the bearing 2, to keep the sliding face 11a of the temple 1 in slidable contact with the sliding face 22a of the bearing 2. Therefore, if the pivotally rotatable shaft 11 is pivotally rotated to pivotally turn the temple 1, a predetermined frictional force acts.

In the above spectacle frame, even if the sliding faces 11a and 22a are worn by long-time use, the elastic means 3 keeps them in mutual contact. So, no play occurs, and the temple turning torque can be kept almost constant.

Since the cut-out portion 22 of the bearing 2 has two vertical contact faces 22b and 22c formed, the temple 1, which is turned over and away from the pair of lenses, can reliably stop at respectively predetermined positions.

Thus, in the hinge structure of the present invention, since the turning of the temple 1 is controlled by the contact faces 22b and 22c of the cut-out portion 22 of the bearing 2, the connecting portion between the temple 1 and the rim 5 is concealed, and furthermore, the elastic means 3 is concealed inside the bearing 2. So, the spectacle frame looks smart. As shown in FIG. 4 as the second example, if the circumference of the flange 12 is kept within the circumference of the bearing 2, the appearance and design can be further improved.

Figure 5:
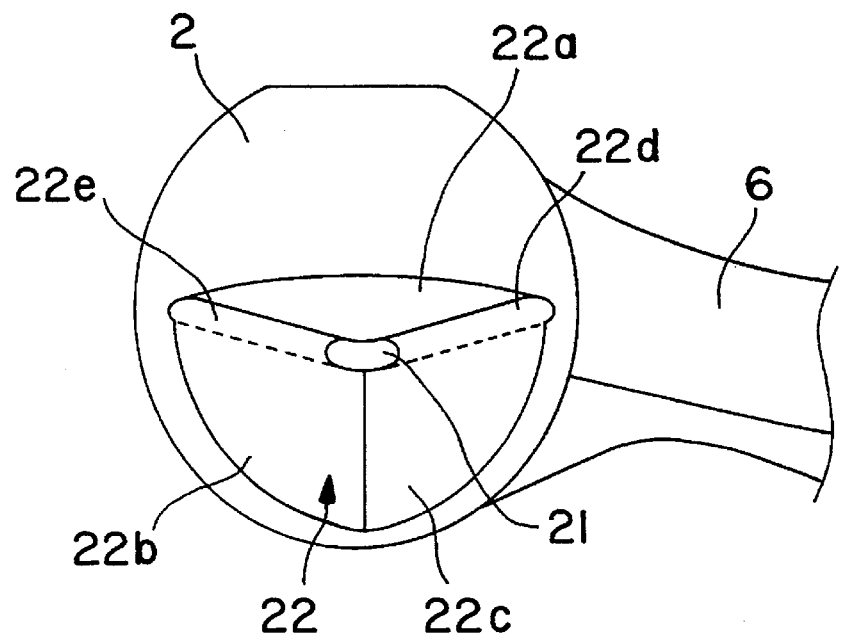
FIG. 5 is an expanded view showing an essential portion for illustrating a third example of the hinge structure of the present invention.
Figure 6:
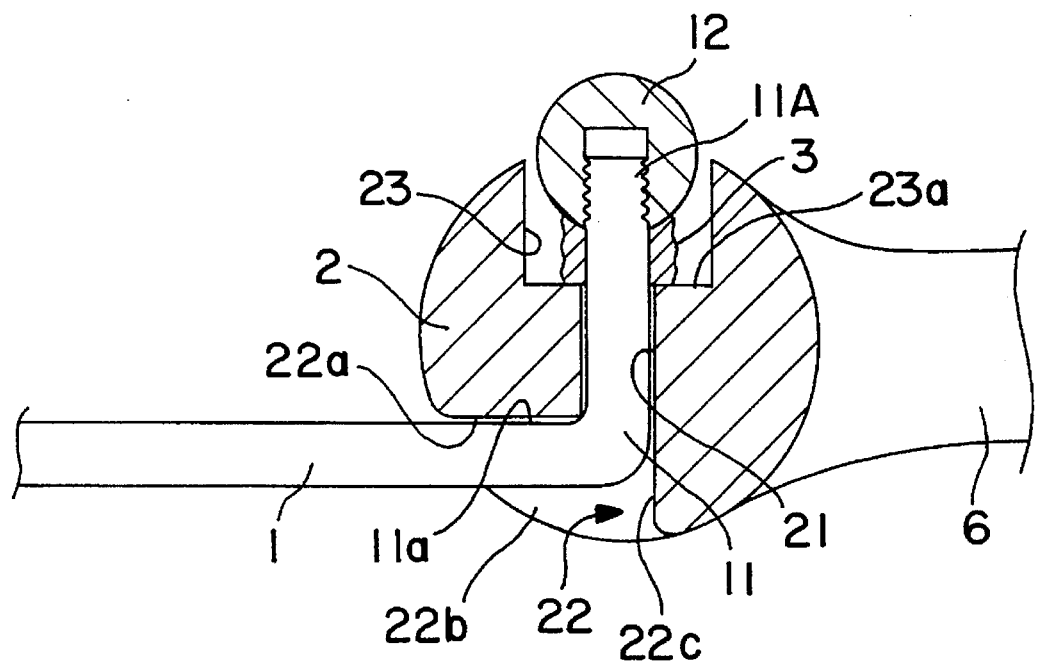
FIG. 6 is an expanded sectional view showing an essential portion for illustrating a fourth example of the hinge structure of the present invention.

The present invention can be variously modified in design, such as adopting a synthetic rubber cylinder as the elastic means 3, as shown in FIG. 6. As other examples of design modifications, the sliding face 22a can be formed as a slope with a slight angle, to make the frictional resistance for turning the temple 1 over the pair of lenses different from that for turning the temple 1 away from the pair of lenses, or the slope can be large in angle, to structurally allow the temple 1 to be automatically turned over or away from the pair of lenses. All of these modifications are included in the present invention. In the hinge structure as the third example, as shown in FIG. 5, grooves 22d and 22e are formed at predetermined positions of the sliding face 22a.

In this example, the sliding face 11a of the temple 1 moving on the sliding face 22a of the bearing 2 fits the groove 22d, to be resiliently held when the temple 1 is turned away from the pair of lenses, and fits the other groove 22e, to be resiliently held when the temple 1 is turned over the pair of lenses, respectively to give a feeling of a click.

I claims:

1. A hinge structure of a spectacle frame, in which bearings 2 are formed at the ends of end pieces 6 provided outside a pair of lenses 4 or outside the rims 5 supporting the lenses 4, and pivotally rotatable shafts 11 at the tips of a pair of temples 1 are pivotally rotatably connected with the bearings 2, comprising:

each of said bearings 2, being provided with a vertical through-hole 21, a cut-out portion 22 formed at the bottom of said through-hole 21 and surrounded by a top sliding face 22a and both side contact faces 22b and 22c, and a recess 23 formed at the top of said through-hole 21 and having a support face 23a at the bottom; each of said temples 1, being provided with the pivotally rotatable shaft 11 bent almost at right angles at its tip with some length and inserted in the through-hole 21 of the bearing 2, a top sliding face 11a near the bend to slidably contact the sliding face 22a of said cut-out portion 22, and a flange 12 protruded at the tip of the pivotally rotatable shaft 11 exposed from the recess 23; and a compressed elastic means 3, being provided around the pivotally rotatable shaft 11 exposed in the recess 23 between the flange 12 and the support face 23a, to give pressure to the bearing 2 for keeping the sliding face 11a of the temple 1 in slidable contact with the sliding face 22a of the bearing 2.

2. A hinge structure of a spectacle frame, according to claim 1, wherein the elastic means 3 is a coil spring.

3. A hinge structure of a spectacle frame, according to claim 1, wherein the elastic means 3 is a rubber.

4. A hinge structure of a spectacle frame, according to any one of claims 1 through 3, wherein at least either of grooves 22d and 22e is provided at least on either of the ridges formed by the sliding face 22a and the contact faces 22b and 22c of the bearing 2.

\* \* \* \* \*